(12) United States Patent
Balzer et al.

(10) Patent No.: US 6,502,653 B1
(45) Date of Patent: Jan. 7, 2003

(54) MULTI-FUNCTIONAL RADIATOR SUPPORT ASSEMBLY

(75) Inventors: Jason Scott Balzer, Canton, MI (US); Michael Henry Maj, Livonia, MI (US); Paul Kenneth Dellock, Northville, MI (US); William P. Edmunds, Monroe, MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/688,102

(22) Filed: Oct. 13, 2000

Related U.S. Application Data
(60) Provisional application No. 60/159,180, filed on Oct. 13, 1999.

(51) Int. Cl.[7] .............................................. B60K 11/04
(52) U.S. Cl. ...................................... 180/68.4; 296/194
(58) Field of Search ............................. 180/68.4, 68.6, 180/299; 296/194, 203.02; 280/781

(56) References Cited

U.S. PATENT DOCUMENTS

| | | | |
|---|---|---|---|
| 3,794,373 A | * 2/1974 | Manning | ..................... 296/28 |
| 4,940,281 A | 7/1990 | Komatsu | |
| 5,059,056 A | 10/1991 | Banthia et al. | |
| 5,123,695 A | 6/1992 | Kanemitsu et al. | |
| 5,209,541 A | 5/1993 | Janotik | |
| 5,213,396 A | 5/1993 | Janotik et al. | |
| 5,228,359 A | 7/1993 | Thomas | |
| 5,271,473 A | * 12/1993 | Ikeda et al. | ................. 180/68.4 |
| 5,271,687 A | 12/1993 | Holka et al. | |
| 5,320,403 A | 6/1994 | Kazyak | |
| 5,332,281 A | 7/1994 | Janotik et al. | |
| 5,338,080 A | 8/1994 | Janotik et al. | |
| 5,343,666 A | 9/1994 | Haddad et al. | |
| 5,348,114 A | 9/1994 | Yamauchi | |
| 5,403,048 A | 4/1995 | Ekladyous et al. | |
| 5,527,404 A | 6/1996 | Warren | |
| 5,558,310 A | * 9/1996 | Furuie et al. | ................ 248/573 |
| 5,573,299 A | 11/1996 | Masuda | |
| 5,658,041 A | * 8/1997 | Girardot et al. | ............ 296/194 |
| 5,944,373 A | 8/1999 | Seksaria et al. | |
| 6,068,327 A | 5/2000 | Junginger | |
| 6,151,986 A | * 11/2000 | Willemsen et al. | ............ 74/512 |
| 6,170,906 B1 | * 1/2001 | Kasuga | ................... 296/203.02 |
| 6,216,810 B1 | * 4/2001 | Nakai et al. | ................ 180/68.4 |
| 6,227,321 B1 | * 5/2001 | Frascaroli et al. | ......... 180/68.4 |
| 6,298,633 B1 | * 10/2001 | McCorkle et al. | ......... 52/787.1 |

\* cited by examiner

*Primary Examiner*—Lesley D. Morris
*Assistant Examiner*—Tony Winner
(74) *Attorney, Agent, or Firm*—Raymond L. Coppiellie

(57) ABSTRACT

A multi-functional radiator support assembly is provided for a motor vehicle. The multi-functional radiator support assembly includes a radiator support being made of a first metal material for operative attachment to forward end of the motor vehicle. The first metal material is a die cast metal material. The multi-functional radiator assembly also includes at least one spacer being made of a second metal material different from the first metal material for being disposed between the radiator support and either one of a body and frame of the motor vehicle to resist galvanic corrosion of the radiator support.

18 Claims, 3 Drawing Sheets

MULTI-FUNCTIONAL RADIATOR SUPPORT ASSEMBLY

CROSS-REFERENCE TO RELATED APPLICATION(S)

The present application claims priority from provisional application Ser. No. 60/159,180 filed Oct. 13, 1999.

BACKGROUND OF THE INVENTION

1. Field of the Invention

The present invention relates generally to radiator supports for motor vehicles and, more specifically, to a magnesium radiator support assembly for a motor vehicle.

2. Description of the Related Art

It is known to provide a radiator support for a motor vehicle. Typically, the radiator support is made of stamped steel. The radiator support has separate components attached thereto. These components include a brace for a hood latch, a grille opening reinforcement (GOR), brackets for the GOR, and a cover for a radiator opening attached to the radiator support.

Although the above radiator support has worked well, it is desirable to provide a single first front structure for a motor vehicle that is die-cast, injection molded, or cast. It is also desirable to reduce weight, variable cost, and labor, while improving quality and vehicle durability, of a radiator support for a vehicle. It is further desirable to provide a radiator support that requires less package space in a vehicle. Therefore, there is a need in the art to provide a new radiator support assembly for a motor vehicle.

SUMMARY OF THE INVENTION

Accordingly, the present invention is a multi-functional radiator support assembly for a motor vehicle. The multi-functional radiator support assembly includes a radiator support being made of a first metal material for operative attachment to forward end of the motor vehicle. The first metal material is a die cast metal material. The multi-functional radiator assembly also includes at least one spacer being made of a second metal material different from the first metal material for being disposed between the radiator support and either one of a body and frame of the motor vehicle to resist galvanic corrosion of the radiator support.

One advantage of the present invention is that a multi-functional radiator support assembly is provided for a motor vehicle. Another advantage of the present invention is that the multi-functional radiator support assembly is a first front structure for the vehicle that is die-cast, injection molded, or cast. Yet another advantage of the present invention is that the multi-functional radiator support assembly combines the function of the radiator support, hood-latch support system, grille opening reinforcement, and several attachment/reinforcement brackets into a single die-cast, injection molded, or cast component. Still another advantage of the present invention is that the multi-functional radiator support assembly uses die-cast magnesium as the material for the structure. A further advantage of the present invention is that the multi-functional radiator support assembly provides improved dimensional control, reduction of tooled end items, fifty percent to seventy percent weight reduction, reduction of variable cost and labor, while improving lateral/torsional bending modes, and one hundred percent improvement in strength and durability of the vehicle. Yet a further advantage of the present invention is that the multi-functional radiator support assembly requires less packaging space, enabling reduction of front end overhang and supporting various styling needs, and saves a large amount of weight.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
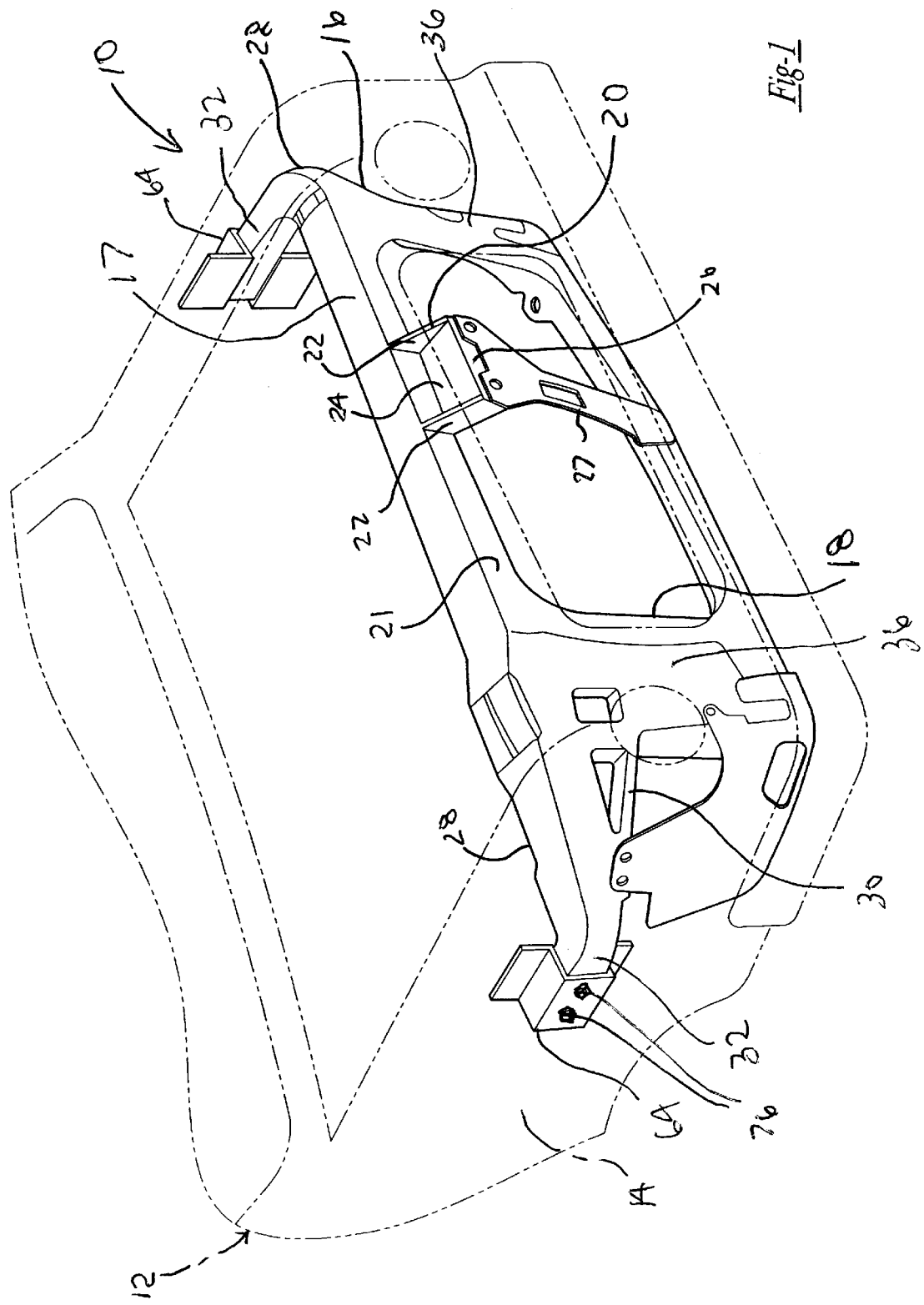
FIG. 1 is a front perspective view of a multi-functional radiator support assembly, according to the present invention, illustrated in operational relationship with a motor vehicle.

Referring to the drawings and in particular FIG. 1, one embodiment of a multi-functional radiator support assembly 10, according to the present invention, is illustrated in operational relationship with a motor vehicle 12. The radiator support assembly 10 is located at a forward or front end of a body 14 of the motor vehicle 12. The radiator support assembly 10 is used to support a radiator (not shown), a condenser (not shown), and/or auxiliary coolers (not shown). It should be appreciated that, except for the multi-functional radiator support assembly 10, the motor vehicle 12 is conventional and known in the art.

Figure 2:
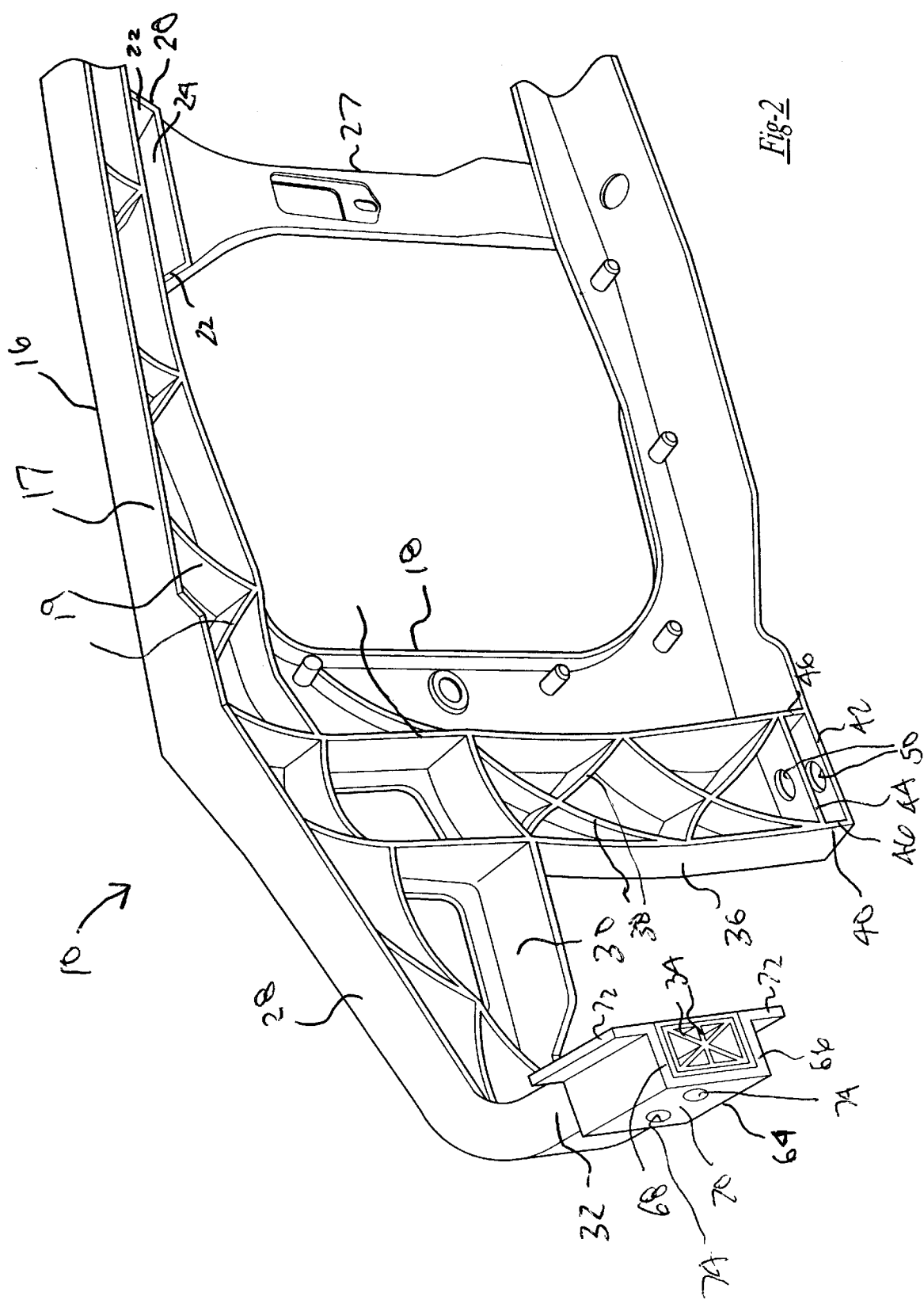
FIG. 2 is a rear perspective view of a portion of the multi-functional radiator support assembly of FIG. 1.
Figure 3:
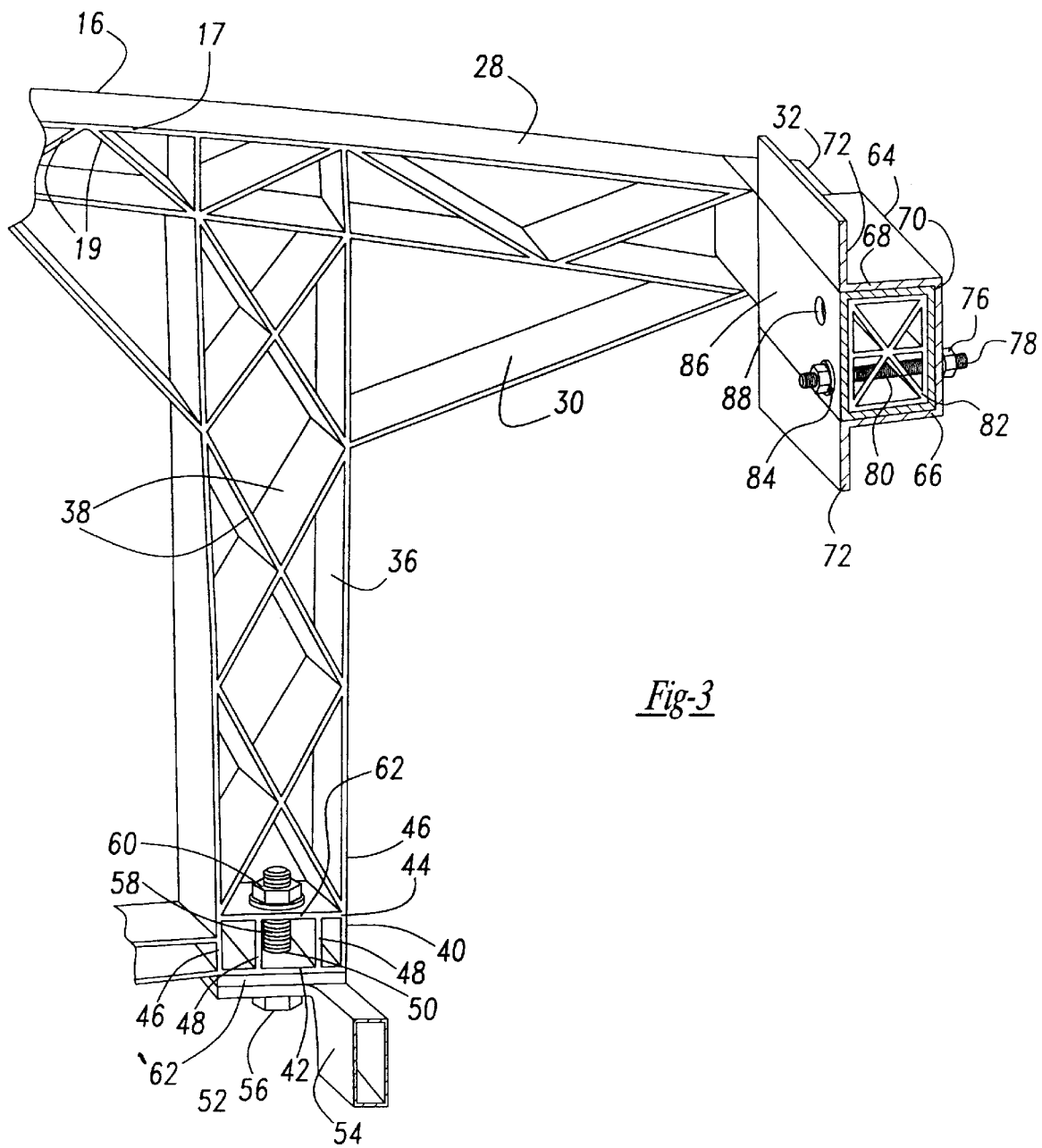
FIG. 3 is a rear perspective view of another portion of the multi-functional radiator support assembly of FIG. 1.

Referring to FIGS. 1 through 3, the multi-functional radiator support assembly 10 includes a radiator support 16 extending generally vertically and laterally. The radiator support 16 is generally rectangular in shape. The radiator support 16 has a front portion 17 and an opening 18 extending longitudinally through the front portion 17. The opening 18 is generally rectangular in shape. The front portion 17 may include at least one, preferably a plurality of rib portions 19 to provide stiffness and strength thereto.

The radiator support 16 also includes a hood-latch support portion 20 extending forwardly and longitudinally from a forward face 21 of the front portion 17 to support a hood-latch (not shown). The support portion 20 is generally rectangular in shape. The support portion 20 includes side walls 22 spaced laterally and extending longitudinally downwardly at an angle and a base wall 24 extending generally laterally and horizontally therebetween. The support portion 20 also includes a forward wall 26 at the forward end of the side walls 22 and base wall 24 for a function to be described. It should be appreciated that a support member 27 may extend between the support portion 20 and the front portion 17 across the opening 18 and either cast in to the radiator support 16 or be attached thereto by suitable means such as fasteners (not shown).

The radiator support 16 has a pair of arm portions 28 extending laterally outwardly from the front portion 17. The arm portions 28 are generally rectangular in shape and extend from an upper end on each side of the front portion 17. The radiator support 16 may include a brace portion 30 extending diagonally between each of the arm portions 28 and the front portion 17.

The radiator support 16 also has an attachment portion 32 extending longitudinally and rearwardly from each of the arm portions 28 for attachment to the body 14 of the motor vehicle 12. The attachment portions 32 are generally rectangular in shape. The attachment portion 32 may include at least one, preferably a plurality of rib portions 34 to provide stiffness and strength thereto.

The radiator support 16 has a pair of leg portions 36 extending generally vertically on both sides of the front portion 17. The leg portions 36 are generally rectangular in shape and are disposed on each side of the front portion 17. The leg portion 36 may include at least one, preferably a plurality of rib portions 38 to provide stiffness and strength thereto. The leg portion 36 may include a frame mount portion 40 at a lower end thereof. The frame mount portion 40 has a lower wall 42 and an upper wall 44 spaced vertically from the lower wall 42. The frame mount portion 40 also has outer walls 46 extending vertically between the lower and upper walls 42 and 44. The frame mount portion 40 may include a pair of inner walls 48 spaced laterally from the outer walls 46 and each other and extending vertically between the lower and upper walls 42 and 44. The frame mount portion 40 includes an aperture 50 extending through the lower and upper walls 42 and 44 and aligned with each other for a function to be described. It should be appreciated that the frame mount portion 40 may be of a double box section.

The radiator support 16 is made as a single structural magnesium die casting. The radiator support 16 is a monolithic structure being integral, unitary, and one-piece. The integrated radiator support 16 weighs approximately fourteen pounds.

Referring to FIG. 3, the multi-functional radiator support assembly 10 includes a fastener 52 to fasten each of the leg portions 36 to a support rail 54 of a frame (not shown) of the vehicle. The fastener 52 is of a bolt type having a head 56 and a threaded shaft 58 extending through an aperture (not shown) in the support rail 54 and through the apertures 50 in the frame mount portion 40. The fastener 52 includes a nut 60 to threadably engage the shaft 58 and abut the upper wall 44. The fastener 52 is made of a metal material such as steel. It should be appreciated that the fastener 52 is conventional and known in the art.

Referring to FIG. 3, the multi-functional radiator support assembly 10 includes spacers 62,62' between the fastener 52, the support rail 54, and the radiator support 16 to resist galvanic corrosion between the steel and magnesium. In one embodiment, the spacer 62 is a washer disposed between the nut 60 and upper wall 44. The spacer 62,62' is made of a metal material such as aluminum or a plastic material. In another embodiment, the spacer 62' may be a plate disposed between the support rail 54 and the lower wall 42.

Referring to FIGS. 1 through 3, the multi-functional radiator support assembly 10 includes bridging brackets 64 to fasten each of the attachment portions 32 of the arm portions 28 to the body 14 of the vehicle 12. The bridging brackets 64 have a lower wall 66, an upper wall 68 spaced vertically from the lower wall 66, and a side wall 70 extending between the lower wall 66 and upper wall 68 to form a generally "U" shaped cross section. The bridging brackets 64 also have a flange 72 extending generally perpendicularly and vertically form the upper wall 68 and lower wall 66. The bridging brackets 64 have at least one, preferably a pair of apertures 74 extending through the side wall 70 for a function to be described. The bridging brackets 64 are made of a metal material such as steel. It should be appreciated that the flanges 72 are fastened or attached to an inner fender (not shown) of the body 14 of the vehicle 12 by suitable means such as welding.

The multi-functional radiator support assembly 10 includes a fastener 76 to fasten each of the bridging brackets 64 to the attachment portions 32 of the radiator support 16. The fastener 76 is of a bolt type having a head 78 and a threaded shaft 80 extending through the aperture 74 in the side wall 70 and an aperture 82 in the attachment portion 32. The fastener 76 includes a nut 84 to threadably engage the shaft 80 and abut a wall of the attachment portion 32. The fastener 76 is made of a metal material such as steel. It should be appreciated that the fastener 76 is conventional and known in the art.

The multi-functional radiator support assembly 10 includes spacers 86 between the fastener 76, the bridging bracket 64, and the radiator support 16 to resist galvanic corrosion between the steel and magnesium. In one embodiment, the spacer 86 is a hollow rectangular sleeve disposed about the attachment portion 32 and between the upper wall 68, lower wall 66, and side wall 70 of the bridging bracket 64. The spacer 86 has at least one, preferably a plurality of apertures 88 extending therethrough and aligned with the apertures 74 and 82 in the bridging bracket 64 and attachment portion 32, respectively. The spacer 86 is made of a metal material such as aluminum. Alternatively, the spacer 86 could be made of a thermoset plastic, which can be melted, but is not limited to melting, when the radiator support assembly 10 is painted and adheres to the bridging brackets 64 and attachment portions 32 to resist galvanic corrosion. It should be appreciated that the nut 84 abuts the spacer 86.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A multi-functional radiator support assembly for a motor vehicle comprising:
   a radiator support being made of a first metal material for operative attachment to forward end of the motor vehicle being made of a second metal material different from said first metal material, said first metal material being a die cast metal material; and
   at least one spacer being made of a material different from said first metal material and the second metal material for being disposed between said radiator support and either one of a body and frame of the motor vehicle to resist galvanic corrosion of said radiator support.

2. A multi-functional radiator support assembly as set forth in claim 1 wherein said material of said at least one spacer is an aluminum or aluminum alloy material.

3. A multi-functional radiator support assembly as set forth in claim 1 wherein said at least one spacer is a hollow rectangular sleeve.

4. A multi-functional radiator support assembly as set forth in claim 1 wherein said at least one spacer is a plate.

5. A multi-functional radiator support assembly as set forth in claim 1 wherein said at least one spacer is a washer.

6. A multi-functional radiator support assembly as set forth in claim 1 including at least one bridging bracket disposed about said at least one spacer and connected to said radiator support for welding to a vehicle body of the vehicle.

7. A multi-functional radiator support assembly as set forth in claim 6 wherein said at least one bridging bracket is made of steel.

8. A multi-functiional radiator support assembly as set forth in claim 6 including at least one fastener to secure said at least one bridging bracket to said radiator support.

9. A multi-functional radiator support assembly as set forth in claim 6 wherein said at least one bridging bracket comprises a lower wall, an upper wall spaced from said lower wall, and a side wall extending between said lower wall and said upper wall to form a generally U-shaped cross-section.

10. A multi-functional radiator support assembly as set forth in claim 9 wherein said at least one bridging bracket includes a flange extending generally perpendicularly from said upper wall and said lower wall for attachment to a body of the motor vehicle.

11. A multi-functional radiator support assembly for a motor vehicle comprising:

a radiator support being made of a magnesium or magnesium alloy material for operative attachment to forward end of the motor vehicle;

at least one bridging bracket being made of a metal material different from said radiator support for attaching said radiator support to a body of the motor vehicle; and at least one spacer being made of a material different from said at least one bridging bracket and said radiator support for being disposed between said radiator support and said at least one bridging bracket to resist galvanic corrosion of said radiator support.

12. A multi-functional radiator support assembly as set forth in claim 12 wherein said at least one bridging bracket includes a flange extending generally perpendicularly from said upper wall and said lower wall for attachment by welding to the body of the motor vehicle.

13. A multi-functional radiator support assembly as set forth in claim 12 wherein said metal material of said at least one bridging bracket is a steel material.

14. A multi-functional radiator support assembly as set forth in claim 11 wherein said at least one bridging bracket comprises a lower wall, an upper wall spaced from said lower wall, and a side wall extending between said lower wall and said upper wall to form a generally U-shaped cross-section.

15. A multi-functional radiator support assembly as set forth in claim 11 wherein said at least one spacer is a hollow rectangular sleeve.

16. A multi-functional radiator support assembly as set forth in claim 11 wherein said at least one spacer is a plate.

17. A multi-functional radiator support assembly as set forth in claim 11 wherein said at least one spacer is a washer.

18. A multi-functional radiator support assembly as set forth in claim 11 wherein said material of said at least one spacer is an aluminum or aluminum alloy material.

* * * * *